US012172537B2

(12) United States Patent
Gonano et al.

(10) Patent No.: US 12,172,537 B2
(45) Date of Patent: Dec. 24, 2024

(54) ROBUST DOCKING OF ROBOTS WITH IMPERFECT SENSING

(71) Applicant: Boston Dynamics, Inc., Waltham, MA (US)

(72) Inventors: Dion Gonano, Somerville, MA (US); Eric Cary Whitman, Arlington, MA (US); Christopher Stathis, Bedford, MA (US); Matthew Jacob Klingensmith, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 236 days.

(21) Appl. No.: 17/644,696

(22) Filed: Dec. 16, 2021

(65) Prior Publication Data

US 2022/0194245 A1 Jun. 23, 2022

Related U.S. Application Data

(60) Provisional application No. 63/129,390, filed on Dec. 22, 2020.

(51) Int. Cl.

| | |
|---|---|
| ***B60L 53/36*** | (2019.01) |
| ***B60L 53/16*** | (2019.01) |
| ***B62D 57/02*** | (2006.01) |
| ***G05D 1/00*** | (2006.01) |
| ***G05D 1/02*** | (2020.01) |

(52) U.S. Cl.

CPC ............... *B60L 53/36* (2019.02); *B60L 53/16* (2019.02); *B62D 57/02* (2013.01); *G05D 1/0214* (2013.01);

(Continued)

(58) Field of Classification Search

CPC .......... B60L 53/36; B60L 53/16; B60L 53/14; B60L 53/37; B60L 53/66; B60L 58/26;

(Continued)

(56) References Cited

U.S. PATENT DOCUMENTS 6,764,373 B1 7/2004 Osawa et al.
7,719,229 B2 * 5/2010 Kaneko ................ G05D 1/0225 446/175

(Continued)

FOREIGN PATENT DOCUMENTS

EP 1819026 A2 8/2007
WO WO 2022/140168 A1 6/2022

OTHER PUBLICATIONS

International Search Report and Written Opinion for the related Application No. PCT/US2021/063941, Dated Apr. 22, 2022, 94 pages.

*Primary Examiner* — Rodney A Butler

(74) *Attorney, Agent, or Firm* — Knobbe, Martens, Olson & Bear, LLP

(57) ABSTRACT

A computer-implemented method when executed by data processing hardware of a legged robot causes the data processing hardware to perform operations including receiving sensor data corresponding to an area including at least a portion of a docking station. The operations include determining an estimated pose for the docking station based on an initial pose of the legged robot relative to the docking station. The operations include identifying one or more docking station features from the received sensor data. The operations include matching the one or more identified docking station features to one or more known docking station features. The operations include adjusting the estimated pose for the docking station to a corrected pose for the docking station based on an orientation of the one or more identified docking station features that match the one or more known docking station features.

20 Claims, 12 Drawing Sheets

(52) U.S. Cl.
CPC ......... *G05D 1/0225* (2013.01); *G05D 1/0274* (2013.01)

(58) Field of Classification Search
CPC .... B62D 57/02; G05D 1/0214; G05D 1/0225; G05D 1/0274; G05D 1/0234; G05D 1/0246; G05D 2201/0217; Y02T 10/70; Y02T 10/7072; Y02T 90/12; Y02T 90/14; Y02T 90/16; B25J 19/005
See application file for complete search history.

(56) References Cited

U.S. PATENT DOCUMENTS

| | | | | |
|---|---|---|---|---|
| 9,468,349 | B2 | 10/2016 | Fong et al. | |
| 9,538,892 | B2 | 1/2017 | Fong et al. | |
| 9,927,814 | B2 | 3/2018 | Wise et al. | |
| 10,175,696 | B2 | 1/2019 | Aldred et al. | |
| 10,335,004 | B2 | 7/2019 | Fong et al. | |
| 10,365,656 | B2 | 7/2019 | Moore et al. | |
| 10,761,539 | B2 | 9/2020 | Moore et al. | |
| 11,426,885 | B1 * | 8/2022 | Rembisz | B25J 5/007 |
| 2006/0043930 | A1 * | 3/2006 | Koyanagi | B25J 19/005 320/114 |
| 2015/0212967 | A1 * | 7/2015 | Griffin | H04W 4/80 710/304 |
| 2016/0268823 | A1 * | 9/2016 | Gonzalez | H02J 7/00 |
| 2016/0304217 | A1 * | 10/2016 | Fisher | B64C 39/024 |
| 2019/0011413 | A1 * | 1/2019 | Caussy | G01N 33/0075 |
| 2020/0246982 | A1 * | 8/2020 | Ishibashi | A63H 13/02 |
| 2020/0290753 | A1 * | 9/2020 | Anastassacos | B64F 1/18 |
| 2021/0050011 | A1 * | 2/2021 | Sawata | B25J 13/003 |

* cited by examiner

ROBUST DOCKING OF ROBOTS WITH IMPERFECT SENSING

CROSS REFERENCE TO RELATED APPLICATIONS

This U.S. patent application is a continuation of, and claims priority under 35 U.S.C. § 119(e) to U.S. Provisional Application 63/129,390, filed on Dec. 22, 2020. The disclosure of this prior application is considered part of the disclosure of this application and is hereby incorporated by reference in its entirety.

TECHNICAL FIELD

This disclosure relates to robust docking of robots with imperfect sensing.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles are features requiring various means coordinated movement provide additional benefits to such industries.

SUMMARY

An aspect of the disclosure provides a computer-implemented method. The computer-implemented method, when executed by the data processing hardware of a legged robot causes the data processing hardware to perform operations including receiving sensor data corresponding to an area including at least a portion of a docking station. The operations further include determining an estimated pose for the docking station based on an initial pose of the legged robot relative to the docking station. Additionally, the operations include identifying one or more docking station features from the received sensor data corresponding to the area including at least the portion of the docking station. Furthermore, the operations include matching the one or more identified docking station features to one or more known docking station features. The operations also include adjusting the estimated pose for the docking station to a corrected pose for the docking station based on an orientation of the one or more identified docking station features that match the one or more known docking station features.

Aspects of the disclosure may include one or more of the following optional features. In some implementations, the operations further include instructing the legged robot to dock at the docking station using the corrected pose for the docking station. In some examples, the operations further include generating a docking station map including terrain information about the docking station using the corrected pose for the docking station. In further examples, the docking station map includes one or more regions corresponding to a region where the legged robot should avoid touching down a respective foot of a leg of the legged robot. The one or more regions are located in the area including at least the portion of the docking station. In further examples, the docking station map includes one or more regions corresponding to a region where the legged robot should avoid moving a body of the legged robot. The one or more regions are located in the area including at least the portion of the docking station. In further examples, the docking station map includes one or more regions indicating a height of the identified docking station features. The one or more regions are located in the area including at least the portion of the docking station. In further examples, the docking station map includes a status indicator for the docking station. The status indicator is based on the matching of the one or more identified docking stations features to the one or more known docking station features. The status indicator identifies availability of the docking station.

In some implementations, the docking station includes a respective docking station feature associated with a contact terminal for charging a battery of the legged robot. In some embodiments, the docking station includes a respective docking station feature corresponding to an alignment tower. The alignment tower is configured to support at least a portion of the legged robot when the legged robot is in a charging pose charging a battery of the legged robot at the docking station.

In some implementations, the operations further include identifying the initial pose of the legged robot relative to the docking station by detecting a fiducial associated with the docking station configured to charge a battery associated with the legged robot, and determining the initial docking pose of the robot relative to the docking station based on the detected fiducial. In some embodiments, the robot is a quadruped.

Another aspect of the disclosure provides a battery-powered robot including a body, one or more legs coupled to the body, data processing hardware, memory hardware in communication with the data processing hardware. The memory hardware stores instructions that when executed on the data processing hardware cause the data processing hardware to perform operations including receiving sensor data corresponding to an area including at least a portion of a docking station. The operations further include determining an estimated pose for the docking station based on an initial pose of the battery-powered robot relative to the docking station. Additionally, the operations include identifying one or more docking station features from the received sensor data corresponding to the area including at least the portion of the docking station. Furthermore, the operations include matching the one or more identified docking station features to one or more known docking station features. The operations also include adjusting the estimated pose for the docking station to a corrected pose for the docking station based on an orientation of the one or more identified docking station features that match the one or more known docking station features.

This aspect of the disclosure may include one or more of the following optional features. In some examples, the operations further include instructing the battery-powered robot to dock at the docking station using the corrected pose for the docking station. In some embodiments, the operations further include generating a docking station map including terrain information about the docking station using the corrected pose for the docking station. In further embodiments, the docking station map includes one or more regions corresponding to a region where the battery-powered robot should avoid touching down a respective foot of the one or more legs of the battery-powered robot. The one or more regions are located in the area including at least the portion of the docking station. In further embodiments, the docking station map includes one or more regions corresponding to a region where the battery-powered robot should avoid moving a body of the battery-powered robot. The one or more regions are located in the area including at least the portion of the docking station. In further embodiments, the docking station map includes one or more regions indicating a height of the identified docking station features. The one or more regions are located in the area including at least the portion of the docking station. In further embodiments, the docking station map includes a status indicator for the docking station. The status indicator is based on the matching of the one or more identified docking stations features to the one or more known docking station features. The status indicator identifies availability of the docking station.

In some implementations, the docking station includes a respective docking station feature associated with a contact terminal for charging a battery of the battery-powered robot. In some embodiments, the docking station includes a respective docking station feature corresponding to an alignment tower. The alignment tower is configured to support at least a portion of the battery-powered robot when the battery-powered robot is in a charging pose charging a battery of the battery-powered robot at the docking station. In some examples, the operations further include identifying the initial pose of the battery-powered robot relative to the docking station by detecting a fiducial associated with the docking station configured to charge a battery associated with the battery-powered robot, and determining the initial docking pose of the robot relative to the docking station based on the detected fiducial. In some embodiments, the battery-powered robot is a quadruped.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As battery-powered robots move about environments, these battery-powered robots will expend energy and require that this expended energy eventually be replenished. In other words, the energy that a battery-powered robot is able to expend is finite and results in the robot proportionately having a finite amount of time to operate. In order to replenish the energy that the robot expends, a battery-powered robot connects to a charging station in a process known as docking. Since it is not uncommon for a robot to dock at the charging station when the robot has a low battery state, if the robot fails to properly connect or dock with the charging station, the robot may run out of battery and require some form of recovery (e.g., human recovery). Unfortunately, having to recover the robot may become an issue when the robot is operating in a remote space. That is, someone or something may not be able to readily recover the robot should the robot run out of battery power. Simply stated, this may inherently defeat the advantage of a battery-powered robot in that a battery-powered robot is able to operate remotely. To overcome such issues, it becomes necessary for the robot to have a reliable and robust docking process that ensures the robot successfully docks with the charging station.

To compound issues with charging stations for battery-powered robots, battery-powered robots that are also legged robots may further complicate the docking process. For example, legged robots demand precise leg coordination for balance while maneuvering about the environment. Generally speaking, when that environment includes obstacles, a legged robot must understand how to account for that obstacle in order to perform a given task for the robot. When the task of the robot is to dock at its charging station, the structure of the charging station itself may be similar to an obstacle for the robot. That is, it is important for the legged robot to know precisely where the dock is located in order to determine suitable footstep locations that enable the legged robot to properly connect (i.e., dock) with the charging station. Otherwise, the legged robot may trip and potentially fall on its own docking station. This is unlike other mobile robots, such as wheel-based robots, that do not have to step path plan to avoid damaging the charging station (e.g., kicking, stepping on, or falling into the charging station) or the robot itself (e.g., tripping and/or falling). Since a legged robot may approach the charging station from different angles and sometimes require repositioning to successfully dock with the charging station, the charging station may pose a unique challenge for legged robots and one that demands a docking process that enables reliable and accurate positioning for the robot.

Figure 1A:
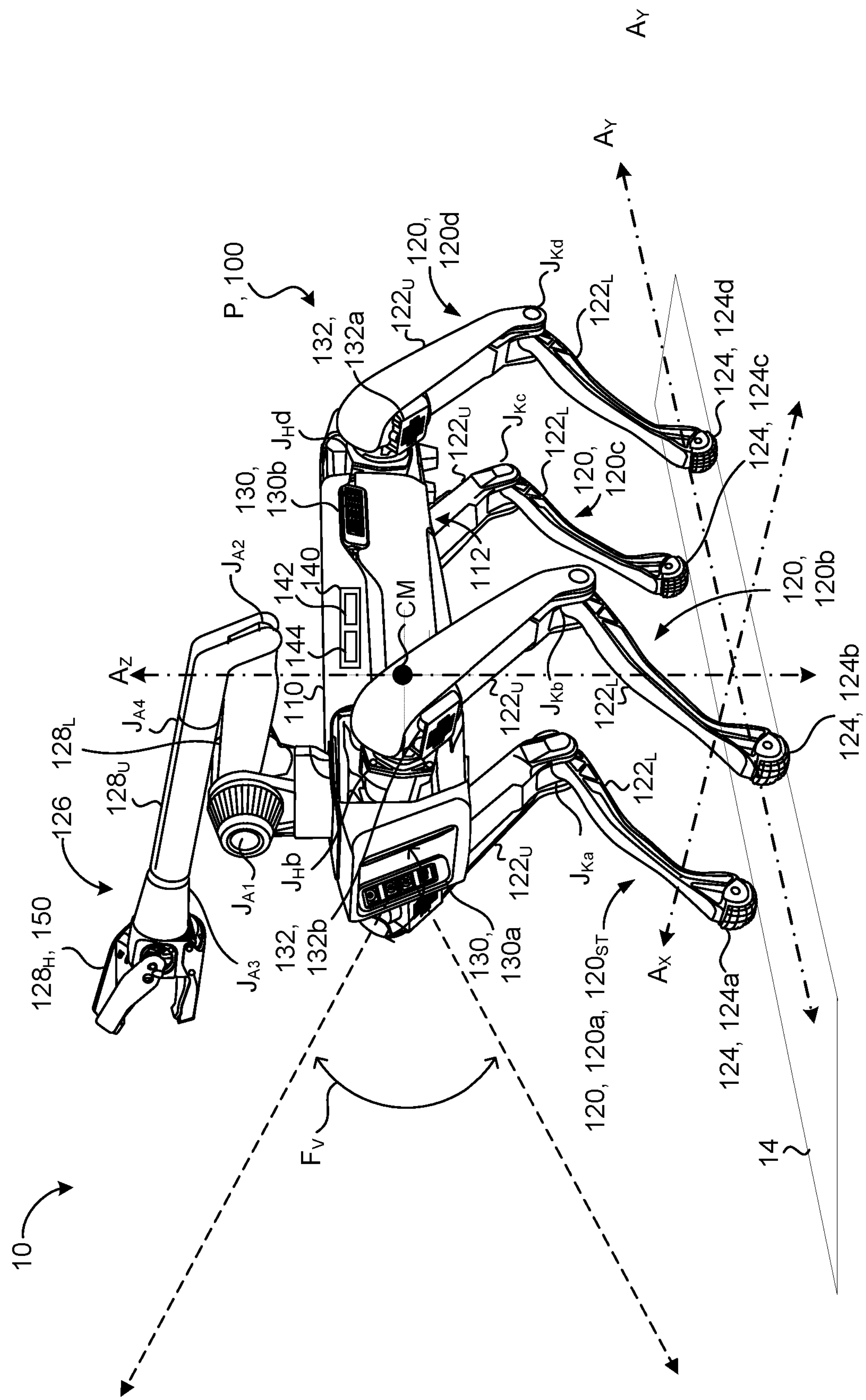
FIG. 1A is a perspective view of an example robot capable of docking on a charging station.
Figure 1B:
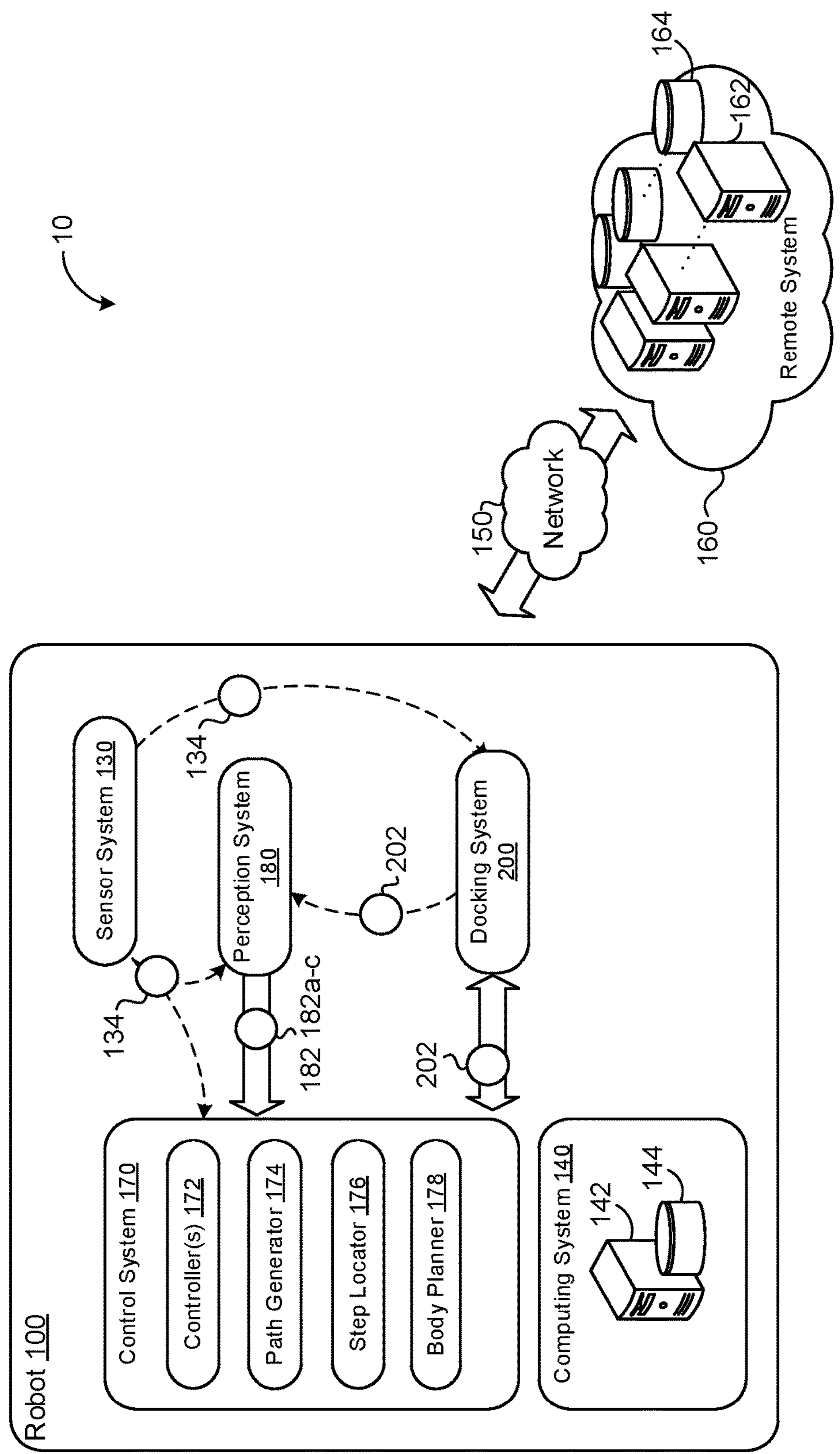
FIG. 1B is a schematic view of example systems of the robot of FIG. 1A.

Referring to FIGS. 1A and 1B, the robot 100 includes a body 110 with locomotion-based structures such as legs 120*a-d* coupled to the body 110 that enable the robot 100 to move about the environment 10. In some examples, each leg 120 is an articulable structure such that one or more joints J permit members 122 of the leg 120 to move. For instance, each leg 120 includes a hip joint JH coupling an upper member 122, $\mathbf{122}_U$ of the leg 120 to the body 110 and a knee joint $J_K$ coupling the upper member 122*u* of the leg 120 to a lower member $\mathbf{122}_L$ of the leg 120. Although FIG. 1A depicts a quadruped robot with four legs 120*a-d*, the robot 100 may include any number of legs or locomotive-based structures (e.g., a biped or humanoid robot with two legs, or other arrangements of one or more legs) that provide a means to traverse the terrain within the environment 10.

Figure 1C:
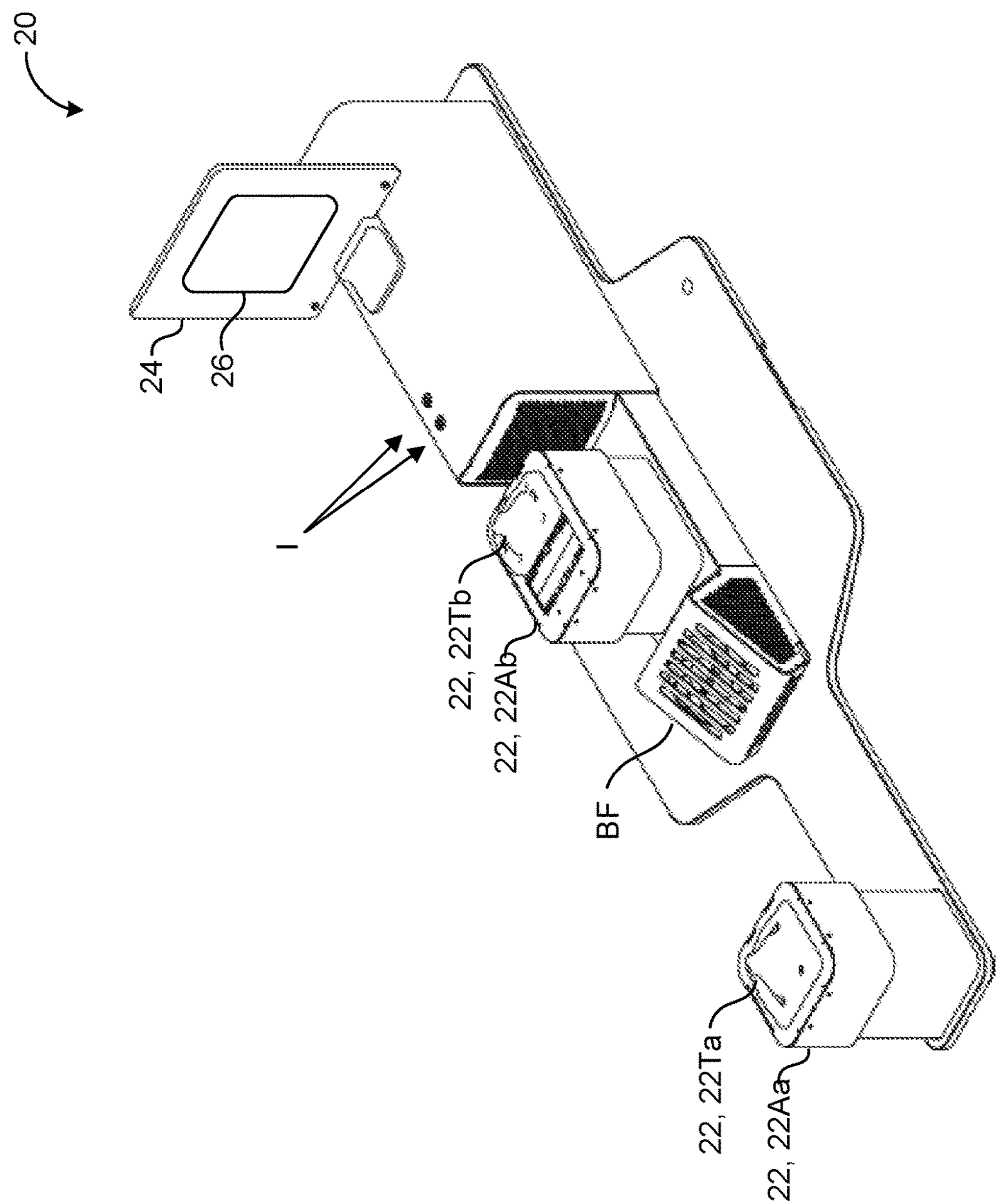
FIG. 1C is a perspective view of an example charging station for the robot of FIG. 1A.

The body 110 includes one or more charging terminals 112 (e.g., shown as a single charging terminal 112 near the hind legs 120, 120*c-d* of the robot 100 in a rear portion of the body 110 of the robot 100 in FIG. 1A). The one or more charging terminals 112 may be located on an underside of the body 110 of the robot 100 such that the terminals 112 face the ground plane 14 and are configured to receive a complimentary terminal of a charging station for the robot 100. In the example of FIG. 1A, the robot 100 includes a single charging terminal 112 in a rear half portion of the body 110 of the robot 100 (e.g., towards the hind legs 120, 120*c-d* of the robot 100). In some implementations, the one or more charging terminals 112 on the underside of the body 110 are centrally disposed along a longitudinal axis of the body 110 to ensure that when the charging terminals 112 of the robot 100 engage with the complimentary charging terminals of the charging station 20, the robot 100 is balanced. In some examples, the charging terminal 112 on the body 110 of the robot 100 includes a housing that serves as a female connector to matingly receive a complimentary male connector that is part of the housing of the terminal of the robot's charging station 20. In this sense, the charging terminal of the charging station 20 protrudes to some degree from the charging station 20 such that contact may be made between the charging terminal 112 on the body 110 of the robot 100 and the terminal on the charging station as the male connector of the charging station 20 seats or couples with the female connector of the robot 100. In some examples, the terminal 112 of the robot 100 is simply a contact landing pad that the robot 100 may lower onto the terminal of the charging station 20. Although FIGS. 1A and 1C depict that the charging station and the robot 100 each include a single charging terminal, each component may have more charging terminals (e.g., two, three, or four terminals). For instance, the robot 100 may include a pair of charging terminals 112 such that the front half portion of the body 120 has a charging terminal 112 similar to the rear half portion of the body 110. Additionally or alternatively, instead of using a direct physical connection to charge the robot 100, the robot 100 may charge wirelessly. For instance, the robot 100 charges using inductive charging where one or more designated portions of the robot 100 may be placed in inductive proximity with one or more specific portions of the charging station 20. Here, similar to direct physical connections, wireless or inductive charging may demand precise placement of the robot 100 with respect to the charging station 20 to ensure that the inductive charging reliably occurs.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $\mathbf{122}_L$ of the leg 120.

In the examples shown, the robot 100 includes an arm 126 that functions as a robotic manipulator. The arm 126 may be configured to move about multiple degrees of freedom in order to engage elements of the environment 10 (e.g., objects within the environment 10). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $\mathbf{128}_L$, an upper member $\mathbf{128}_U$, and a hand member $\mathbf{128}_H$ (e.g., also referred to as an end-effector $\mathbf{128}_H$). Here, the lower member $\mathbf{128}_L$ may rotate or pivot about a first arm joint $J_{A1}$ located adjacent to the body 110 (e.g., where the arm 126 connects to the body 110 of the robot 100). The lower member $\mathbf{128}_L$ is coupled to the upper member $\mathbf{128}_U$ at a second arm joint $J_{A2}$ and the upper member $\mathbf{128}_U$ is coupled to the hand member $\mathbf{128}_H$ at a third arm joint $J_{A3}$. In some examples, such as FIG. 1A, the hand member $\mathbf{128}_H$ or end-effector $\mathbf{128}_H$ is a mechanical gripper that includes a one or more moveable jaws configured to perform different types of grasping of elements within the environment 10. In the example shown, the end-effector $\mathbf{128}_H$ includes a fixed first jaw and a moveable second jaw that grasps objects by clamping the object between the jaws. The moveable jaw is configured to move relative to the fixed jaw in order to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $\mathbf{128}_L$ to the upper member $\mathbf{128}_U$ and function to allow the upper member $\mathbf{128}_U$ to twist or rotate relative to the lower member $\mathbf{128}_L$. In other words, the fourth joint $J_{A4}$ may function as a twist joint similarly to the third joint $J_{A3}$ or wrist joint of the arm 126 adjacent the hand member $\mathbf{128}_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 may attach or detach from the robot 100 depending on whether the arm 126 is desired for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120*a* to a right side of the robot 100 with a second leg 120*b*). The frontal plane spans the X-Z plane by extending in directions of the x-direction axis $A_X$ and the z-direction axis $A_Z$.

In order to maneuver about the environment 10 or to perform tasks using the arm 126, the robot 100 includes a sensor system 130 with one or more sensors 132, 132*a-n*. For instance, FIG. 1A illustrates a first sensor 132, 132*a* mounted at a head of the robot 100, a second sensor 132, 132*b* mounted near the hip of the second leg 120*b* of the robot 100, a third sensor 132, 132*c* corresponding one of the sensors 132 mounted on a side of the body 110 of the robot 100, a fourth sensor 132, 132*d* mounted near the hip of the fourth leg 120*d* of the robot 100, and a fifth sensor 132, 132*e* mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. The sensor system 130 may generate the field of view $F_V$ with a sensor 132 mounted on or near the body 110 of the robot 100 (e.g., sensor(s) 132*a*, 132*b*). The sensor system may additionally and/or alternatively generate the field of view $F_V$ with a sensor 132 mounted at or near the end-effector $128_H$ of the arm 126 (e.g., sensor(s) 132*c*). The one or more sensors 132 may capture sensor data 134 that defines the three-dimensional point cloud for the area within the environment 10 about the robot 100. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 10 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132*b-d*). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, the perception system 180, and/or the docking system 200). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources, such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170 and a perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order to perform controlled actions for the robot 100, such as moving the robot 100 about the environment 10. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 122, 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120*a-b*, four legs 120*a-d*, or two legs 120*a-b* combined with the arm 126.

In some examples, the control system 170 includes at least one controller 172, a path generator 174, a step locator 176, and a body planner 178. The control system 170 may be configured to communicate with at least one sensor system 130 and any other system of the robot 100 (e.g., the perception system 180 and/or the docking system 200). The control system 170 performs operations and other functions using the computing system 140. The controller 172 is configured to control movement of the robot 100 to traverse about the environment 10 based on input or feedback from the systems of the robot 100 (e.g., the sensor system 130, the perception system 180, and/or the docking system 200). This may include movement between poses and/or behaviors of the robot 100. For example, the controller 172 controls different footstep patterns, leg patterns, body movement patterns, or vision system-sensing patterns.

In some implementations, the control system 170 includes specialty controllers 172 that are dedicated to a particular control purpose. These specialty controllers 172 may include the path generator 174, the step locator 176, and/or the body planner 178. Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perception system 180 (e.g., map(s) 182). The body planner 178, much like the step locator 176, receives inputs from the perception system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

In some examples, the one or more maps 182 generated by the perception system 180 are a ground height map 182, 182*a*, a no step map 182, 182*b*, and a body obstacle map 182, 182*c*. The ground height map 182*a* refers to a map 182 generated by the perception system 180 based on spatial occupancy of an area (e.g., the environment 10) divided into three-dimensional volume units (e.g., voxels from a voxel map). In some implementations, the ground height map 182*a* functions such that, at each X-Y location within a grid of the map 182 (e.g., designated as a cell of the ground height map 182*a*), the ground height map 182*a* specifies a height. In other words, the ground height map 182*a* conveys that, at a particular X-Y location in a horizontal plane, the robot 100 should step at a certain height.

The no step map 182*b* generally refers to a map 182 that defines regions where the robot 100 is not allowed to step in order to advise the robot 100 when the robot 100 may step at a particular horizontal location (i.e., location in the X-Y plane). In some examples, much like the body obstacle map 182*c* and the ground height map 182*a*, the no step map 182*b* is partitioned into a grid of cells where each cell represents a particular area in the environment 10 about the robot 100. For instance, each cell is a three centimeter square. For ease of explanation, each cell exists within an X-Y plane within the environment 10. When the perception system 180 generates the no-step map 182*b*, the perception system 180 may generate a Boolean value map where the Boolean value map identifies no step regions and step regions. A no step region refers to a region of one or more cells where an obstacle exists while a step region refers to a region of one or more cells where an obstacle is not perceived to exist. The perception system 180 further processes the Boolean value map such that the no step map 182*b* includes a signed-distance field. Here, the signed-distance field for the no step map 182*b* includes a distance to a boundary of an obstacle (e.g., a distance to a boundary of the no step region) and a vector v (e.g., defining nearest direction to the boundary of the no step region) to the boundary of an obstacle.

The body obstacle map 182*c* generally determines whether the body 110 of the robot 100 may overlap a location in the X-Y plane with respect to the robot 100. In other words, the body obstacle map 182*c* identifies obstacles for the robot 100 to indicate whether the robot 100, by overlapping at a location in the environment 10, risks collision or potential damage with obstacles near or at the same location. As a map of obstacles for the body 110 of the robot 100, systems of the robot 100 (e.g., the control system 170) may use the body obstacle map 182*c* to identify boundaries adjacent, or nearest to, the robot 100 as well as to identify directions (e.g., an optimal direction) to move the robot 100 in order to avoid an obstacle. In some examples, much like other maps 182, the perception system 180 generates the body obstacle map 182*c* according to a grid of cells (e.g., a grid of the X-Y plane). Here, each cell within the body obstacle map 182*c* includes a distance from an obstacle and a vector pointing to the closest cell that is an obstacle (i.e., a boundary of the obstacle).

FIG. 1C is an example of a charging station 20 (also referred to as a docking station) for the robot 100. The charging station 20 generally includes one or more features 22 and a fiducial plate 24 for displaying a fiducial 26 associated with the charging station 20. In this example, the charging station 20 also includes indicators I for conveying whether the robot 100 is charging or generally powered-on as well as a battery fan BF for cooling the battery of the robot 100 when the robot 100 is docked on the charging station 20. In some examples, the features 22 of the charging station 20 may include one or more alignment towers 22A (e.g., shown as two alignment towers 22, 22Aa, 22Ab) and one or more terminals 22T that are configured to charge the battery of the robot 100. Each alignment tower 22A (e.g., the rear alignment tower 22Ab) may include a charging terminal 22T with an electrically conductive contact surface to charge the battery of the robot 100. In some implementations, such as FIG. 1C, the charging station 20 includes two alignment towers 22A, 22Aa-b with a single charging terminal 22T associated with the rear alignment tower 22Ab that will connect or electrically couple with the robot 100 at a rear portion of the robot 100 (e.g., near the hind legs 120, 120c-d of the robot 100). In this implementation, the charging terminal 22, 22T is located adjacent to an alignment feature of the rear tower 22Ab (e.g., shown as a conical indexing structure). Although FIG. 1C illustrates a single charging terminal 22T, the charging station 20 may include any number of charging terminals 22T to adequately charge the robot 100 (i.e., to mate with terminal(s) 112 of the robot 100). In some configurations, the top surface of the alignment tower 22A that faces the robot 100 protrudes from the alignment tower 22A in a conical-like or pyramid-like structure for alignment purposes. Although the charging terminal 22T of the charging station 20 is shown as separate from the apex or peak of the alignment tower 22A, the charging terminal 22T may additionally or alternatively be configured to be located at the apex or peak protruding at the top of the alignment tower 22A. In either configuration, the charging terminal 22T of the charging station 20 may couple with one or more complimentary charging terminals 112 (e.g., charging terminal 112) on the robot 100.

The fiducial plate 24 generally refers to a structure that is capable of displaying the fiducial 26. Here, a fiducial 26 refers to an object that the robot 100 may use as a point of reference (e.g., a local or global identifier of some spatial relationship). A fiducial 26 may be encoded with a data payload that includes information relevant to the operation of the robot 100 and/or information about the point of reference that the fiducial 26 represents. For instance, the payload of the fiducial 26 associated with the charging station 20 may identify information about the charging station 20. As an example, a robot 100 may be associated with or designated to a particular charging station 20 and the fiducial 26 may be encoded with information that identifies this relationship. The information may include a unique identifier for the charging station 20 that is recognizable to the robot 100 corresponding to the charging station 20 (e.g., the robot 100 shares the same identifier). In some examples, the sensor system 130 and/or the perception system 180 uses the fiducial 26 as a visual marker to establish a reference point within the environment 10 about the robot 100 (e.g., for localization of the robot 100). In some configurations, the fiducial 26 is a visual marker used for localization by the robot 100. Some examples of the types of visual fiducials 26 that may be used by systems of the robot 100 include AprilTags or QR codes that are not significantly influenced by lighting conditions and/or other environmental conditions. The type of fiducial 26 associated with the charging station 20 may be based on a desired detection range for the fiducial and/or the size of the payload encoded by the fiducial 26.

The structure of the charging station 20 may pose a unique risk to the legged robot 100. In other words, the charging station 20 includes structures or features 22 that the perception system 180 of the robot 100 may normally perceive as obstacles or regions where the robot 100 should not step (i.e., no step regions). For instance, if one or more legs 120 of the robot 100 collide or contact an alignment tower 22A or the structure for the fiducial plate 24, the robot 100 may trip and possibly damage some component of itself or the charging station 20. Since a robot 100 only has a finite charge for its battery, the robot 100 may have to return to and to dock on the charging station 20 to charge at a semi-frequent basis (e.g., once a day, multiple times a day, or several times a week). With this increased frequency, the chances that an alignment error occurs between the robot 100 and the charging station 20 may also increase. Furthermore, to dock on the charging station 20 means that the robot 100 has to successfully align its charging terminals 112 with the charging terminals 22T of the charging station 20 to receive electrical energy that charges the battery of the robot 100. The charging terminal 22T may also serve as a communication link for transferring other information between the robot 100 and the charging station 20, such as various types of data (e.g., sensor data 134 or processed sensor data). For successful alignment, the robot 100 may need to reposition itself by moving its legs 120 and/or body 110 while in or above some aspect of the charging station 20. It should also be noted, that a charging station 20 may serve as a source of power for the robot 100. In other words, the charging station 20 may power the robot 100 such that the robot 100 does not need a battery or expend power stored in a battery while the robot 100 is connected to the charging station 20.

Referring back to FIG. 1B, the docking system 200 is a system of the robot 100 that is configured to reliably dock the robot 100 at the charging station 20. In other words, the docking system 200 attempts to address issues with docking the robot 100 on the charging station 20. In addition to some of the issues previously discussed, the docking system 200 also addresses the issue that features 22 (e.g., the alignment tower(s) 22A and/or the charging terminal(s) 22T) of the charging station 20 may be quite small when compared to the size of the robot 100 and therefore the sensor system 130 and/or the perception system 180 of the robot 100 may have difficulty recognizing these features 22 when docking the robot 100. Another issue that the docking system 200 seeks to resolve is shown in FIG. 2B. That is, when the robot 100 stands from a docking pose successfully docked on the charging station 20, the sensor system 130 cannot visualize aspects of the charging station 20 (e.g., the geometry of the charging station 20) because the visual sensors 132 of the robot 100 are peering outward from the robot 100 or are occluded to some degree as to at least some features 22 of the charging station 20. FIG. 2B illustrates the perceived environment 10 about the robot 100 and the area under and/or immediately adjacent to the robot 100 as a black or dark area with little to no perceived information. Therefore, when the robot 100 attempts to leave the charging station 20 from the docking pose, the robot 100 may be operating blind with respect to avoidance or footpath planning in relation to the charging station 20.

The docking system 200 may also correct or modify the detection-based errors with respect to the location of the charging station 20. In other words, from the sensor data 134 and a pose of the robot 100 when the sensor data 134 was collected, the charging station 20 may be perceived to be at an estimated pose (i.e., have an estimated position and/or orientation) with respect to the pose of the robot 100. Yet this estimated pose Pc (also referred to as a pose of the charging station 20) for the charging station 20 may be inaccurate to a degree that may compromise the ability of the robot 100 to successfully dock at the charging station 20, especially when the charging station 20 includes features 22 that demand precise alignment (e.g., the charging terminals 22T of the charging station 20). Therefore, the docking system 200 is configured to correct the estimated pose Pc (i.e., to generate a corrected pose Pc) for the charging station 20. For instance, an algorithm used to detect the location of the charging station 20 (e.g., a fiducial detection algorithm) inherently has some degree of error between the estimated pose Pc of the charging station 20 (e.g., a detected pose of the charging station 20 with respect to the fiducial 26) and the actual pose of the charging station 20 (e.g., the actual pose of the charging station 20 with respect to the fiducial 26). For example, the type of sensor 132 or camera perceiving the charging station 20 may contribute to detection-based errors. Generally speaking, when the robot 100 uses a visual fiducial 26, there is an existing spatial relationship between the pose of the fiducial 26 and one or more features 22 of the charging station 20 (e.g., an alignment tower 22A of the charging station 20). Due to this relationship, the docking system 200 receives sensor data 134 identifying the fiducial 26. From this sensor data 134, the docking system 200 determines the robot's 100 proximity and pose (e.g., position and orientation of the robot 100) with respect to the existing (i.e., preconfigured) spatial relationship between the fiducial 26 and the charging system 20. In other words, from the robot's perceived relationship between the location and/or pose state of the robot 100 and the fiducial 26, the docking system 200 determines the robot's spatial relationship to the charging station 20 (e.g., one or more features 22 of the charging station 20).

The docking system 200 is configured to receive sensor data 134 and to generate a docking station map 202 based on the received sensor data 134 corresponding to the charging station 20. Here, by generating a docking station map 202, the docking system 200 takes the sensor data 134 and uses some portion of the sensor data 134 to inject known details regarding the charging station 20. In this respect, systems of the robot 100 may query the docking station map 202 generated by the docking system 200 to gain an accurate understanding of the charging station 20 and an area about the charging station 20. This allows the perception system 180 and/or the control system 170 of the robot 100 to avoid relying solely on the perceived sensor data 134.

When the robot 100 is docking (i.e., moving to the charging station 20 and assuming a docking pose that successfully couples charging terminal(s) 112 of the robot 100 to the charging terminal(s) 22T of the charging station 20) or de-docking (i.e., leaving the charging station area starting from the docking pose), the control system 170 for the robot 100 can utilize a fine-grained map specific to the charging station 20, the docking station map 202. This means that as the robot 100 moves in the vicinity of the charging station 20 (i.e., the charging station area) represented in the docking station map 202, the control system 170 may query the docking station map 202 to determine if a particular location on the map 202 is safe or not safe for the robot 100 to move into (e.g., with its body 110) or to step on (e.g., with a foot 124). The docking station map 202 may be considered as a fine-grain map because the docking station map 202 may be scaled to have the necessary resolution to include features 22 of the charging station 20. For example, the maps 182 generated by the perception system 180 and/or derived from the sensor data 134 may be at a particular resolution (e.g., a three-centimeter block resolution). Yet the docking system 200 may be configured to generate a map of greater resolution (e.g., a one centimeter block resolution) than these maps 182 in order to represent features 22 of the charging station 20 such as the charging terminals 22T of the charging station 20. Additionally or alternatively, the docking system 200 can generate a map of terrain information that includes, for example, edges specified by points rather than a grid of a specific resolution; thereby potentially avoiding resolution-based issues. Thus, by generating the docking station map 202, the docking system 200 enables the robot 100 to have improved navigation and dock posing behaviors to avoid potentially costly foot placement mistakes by the robot 100 in the charging station area.

Figure 2A:
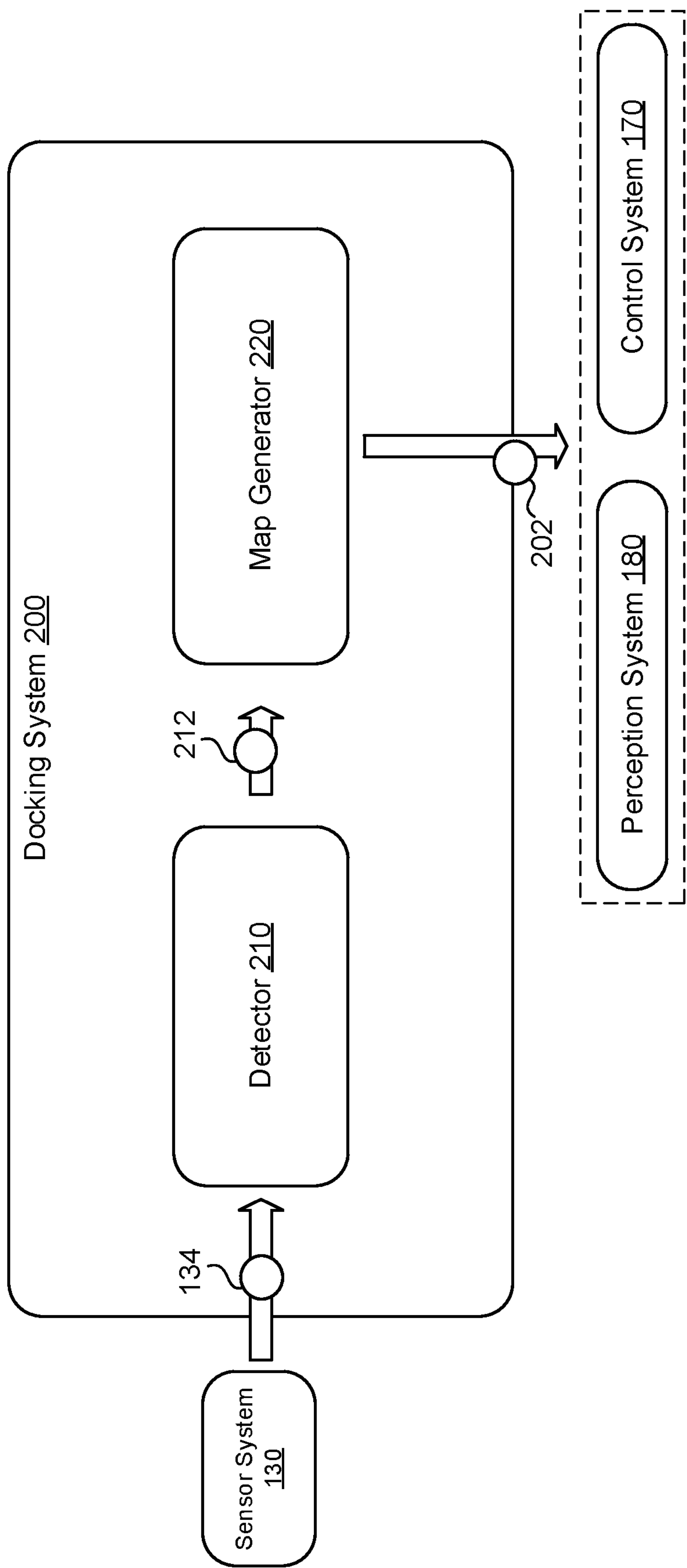
FIGS. 2A-2C are schematic views of example docking system of the robot of FIG. 1A.
Figure 2B:
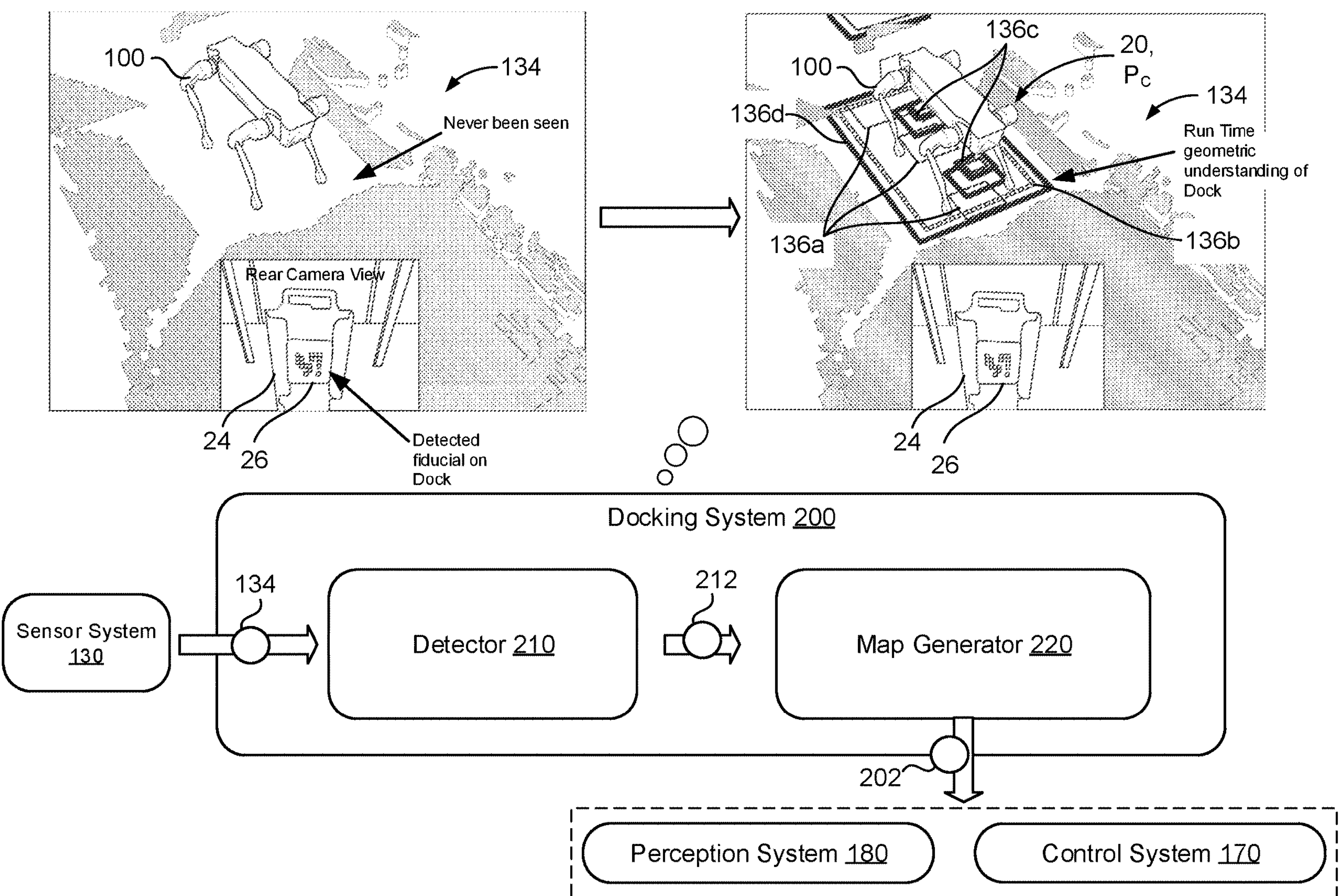
Figure 2C:
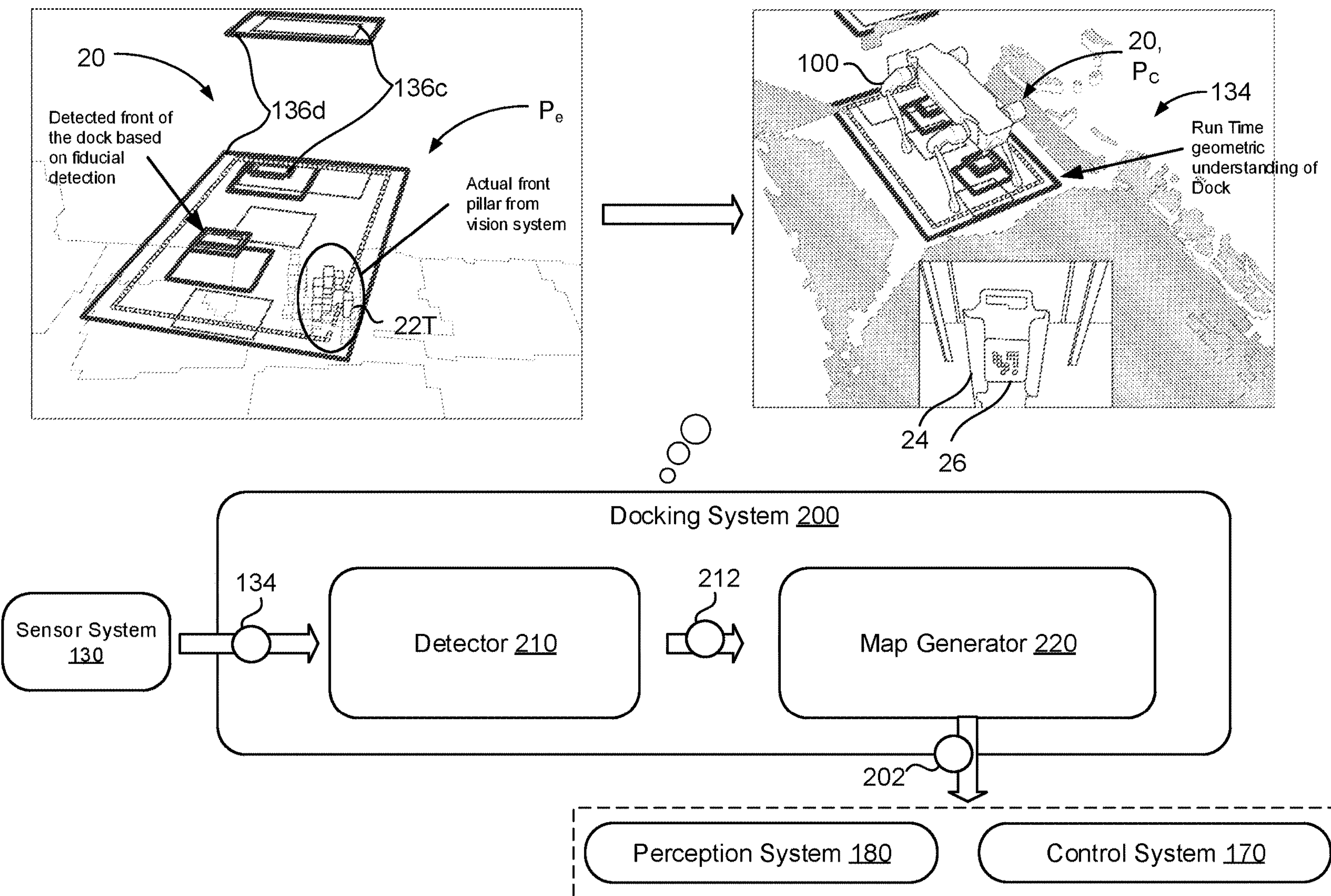

In some implementations, such as FIGS. 2A-2C, the docking system 200 includes a detector 210 and the map generator 220. The detector 210 is configured to receive sensor data 134 corresponding to an area that includes the charging station 20. Based on the sensor data 134, the detector 210 identifies that the charging station 20 is present within the area being sensed by the robot 100. For example, the detector 210 identifies that the charging station 20 is present within the area by recognizing a fiducial 26 adjacent to the charging station 20. In some examples, the detector 210 is able to decode information encoded in the fiducial 26 in order to identify that the charging station 20 corresponds to the robot 100. For instance, the decoded information may include some identifier (e.g., a unique identifier UID) that indicates that the charging station 20 is for the robot 100. When the detector 210 identifies that the charging station 20 is present in the area about the robot 100, the detector 210 may identify a current pose P of the robot 100 in order to understand the spatial relationship between the robot 100 and the charging station 20. In other words, the detector 210 determines a pose for the robot relative to the detected charging station 20.

The detector 210 is also configured to use the received sensor data 134 to identify one or more features 22 of the charging station 20. For example, the detector 210 uses perception sensor data 134 that refers to sensor data 134 from the sensor system 130 that has been processed by the perception system 180. When the detector 210 identifies one or more features 22 of the charging station 20, the detector 210 is able to determine whether the identified feature(s) 22 of the charging station 20 match any prior knowledge that the docking system 200 has of the charging station 20 for the robot 100. For example, the docking system 200 is programmed with prior knowledge as to the geometry of the charging station 20 for the robot 100. With this prior knowledge, the detector 210 may compare the identified features 22 of the charging station 20 from the sensor data 134 to geometric features of the known geometry for the charging station 20. When the comparison between the identified features 22 of the charging station 20 from the sensor data 134 and the geometric features of the known geometry for the charging station 20 result in a match or an approximate match, the detector 210 passes the matching geometric features 212 of the known geometry for the charging station 20 to the map generator 220.

In some examples, the docking system 200 may include an inventory of known charging stations 20 and their respective geometries. With geometries for several known charging stations 20, the detector 210 may be configured to generate a matching score between one or more identified features 22 from the sensor data 134 and one or more geometric features for a known charging station 20. In some implementations, when generating the matching score, the detector 210 may use multiple features 22 from the sensor data 134 and generate a matching score as an overall score as to how closely these multiple features 22 match multiple features of the geometry of a known charging station 20. The detector 210 may score some or all of the known charging station 20 in its inventory and determine that a particular known charging station 20 with the highest score is the charging station 20 from the sensor data 134 perceived at the robot 100.

The map generator 220 receives the matching geometric features 212 with their associated known charging station 20 and generates the docking station map 202. The docking station map 202 generated by the map generator 220 may include regions indicating terrain planning information similar to the regions or cells of the perception system maps 182. For instance, FIGS. 2B and 2C include representations of the environment 10 about the robot 100 to illustrate the map generation by the map generator 220. Referring to FIG. 2B, the top left image portrays little to no terrain information in the vicinity of the robot 100 (e.g., shown as a white, non-shaded area). In contrast, the top right image shows regions bounded by shaded lines 136*a-d* in the same vicinity about the robot 100. These lines 136*a-d* represent the terrain information that the map generator 220 is able to derive form the geometry of the known charging station 20 that matches the identified feature(s) 22 and inject or augment to generate the docking station map 202. Here, the areas bounded by lines 136*a* represent no step regions (i.e., regions unsafe for foot placement). The areas bounded by lines 136*b* represent regions that are step regions (i.e., regions that are safe for foot placement). The areas bounded by lines 136*c* represent terrain height regions identifying, for example, the charging terminals 22T of the docking station 20. The areas bounded by lines 136*d* represent regions that include an obstacle that is at a collision height with a leg 120 or body 110 of the robot 100. By generating the docking station map 202 that includes one or more of these types of regions for the charging station 20, the control system 170 may use the map 202 to move to and to assume a docking pose that has a reliable degree of success to charge the battery of the robot 100 without issue.

FIG. 2C illustrates the process of matching the identified features 22 from the sensor data 134 to the geometric features of a known charging station 20. Here, the top left image depicts where the terrain information would be located based on fiducial detection alone without or prior to any matching of features. In the top left image, the actual front alignment tower 22A of the charging station 20 perceived by the robot 100 does not align with the regions of the terrain information. In other words, the charging station 20 is actually located at a position about 30 degrees to the right of the regions of the terrain information. In this example, the docking system 200 proceeds to match the identified features 22 (e.g., the actual front alignment tower 22A) to the geometric features of the known charging station 20. The docking system 200 therefore learns based on the matching process that the terrain information should be skewed to the right about 30 degrees to align with the sensed features 22 of the charging station 20.

Figure 2D:
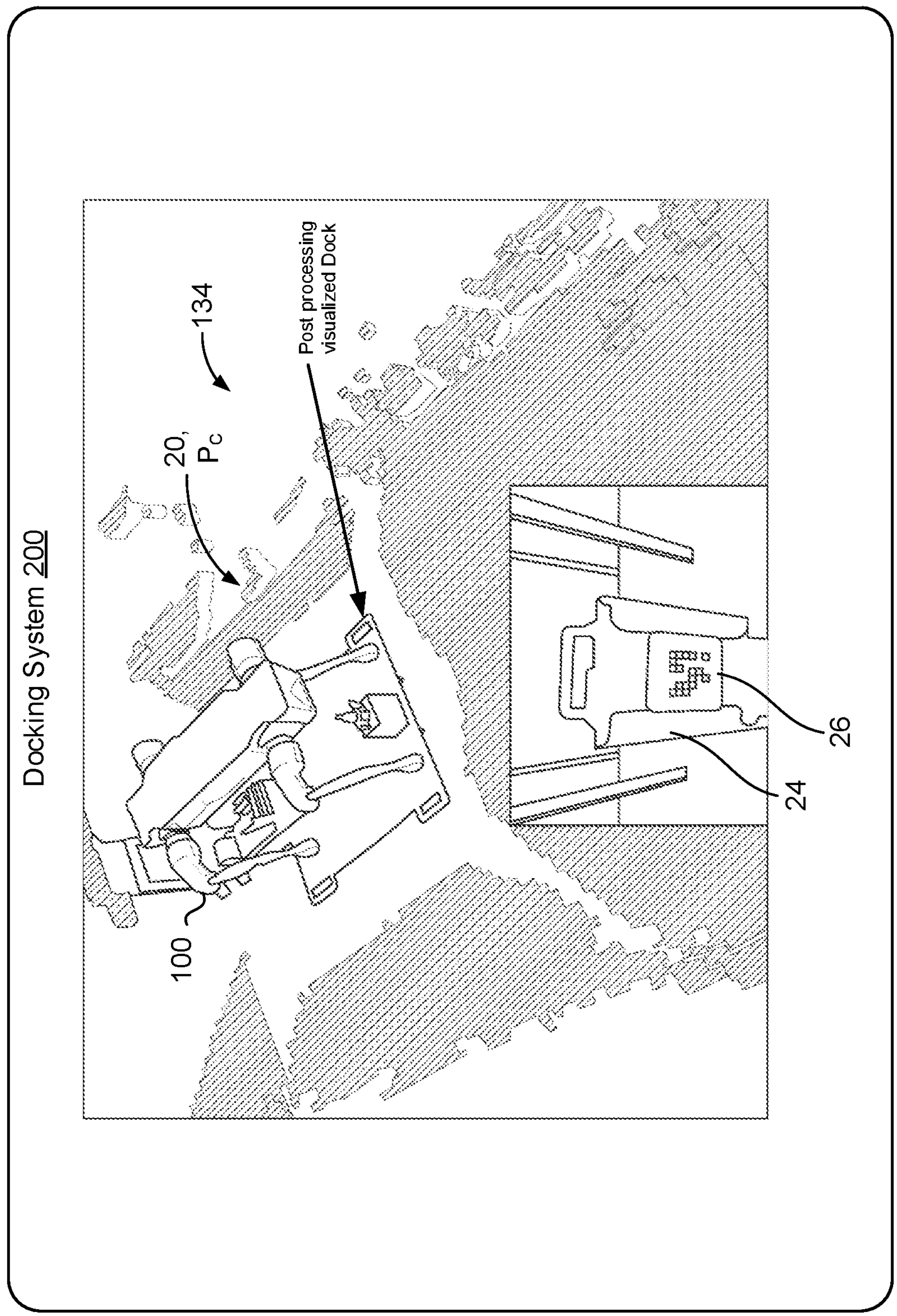
FIG. 2D is a perspective view of an example rendering of a charging station aligned with the robot of FIG. 1A.

FIG. 2D illustrates the high-level concept that the docking system 200 is aiming to achieve. In this figure, the robot 100 is standing at the charging station 20 above a rendering of the charging station 20 including its various features 22. The goal of the docking system 200 is to provide a docking station map 202 to the robot 100 that most closely resembles the rendering of FIG. 2D. In other words, the best theoretical docking station map 202 includes every minute detail about the charging station 20 to provide the robot 100 with the best information as to how to move in the vicinity of the charging station 20. By constructing a docking station map 202 that uses prior known geometry of the features of the charging station 20, the docking system 200 may allow the robot 100 to approach such information.

In some implementations, the docking system 200 may determine whether a charging station 20 has a status that is valid or invalid, such as based on the matching of the identified features 22 to the geometric features of the known charging station 20. For example, the docking system may score the estimated pose $P_e$ by how well the sensor data 134 matches the estimated pose $P_e$. If the docking system 200 does not score the estimated pose $P_e$ high, such as because another robot is on the charging station 20 or the detected charging station is not a real charging station 20, the docking system 200 marks the status of the charging station 20 as invalid. The robot 100 will not attempt to dock with a charging station 20 marked as invalid. Conversely, if the docking system 200 marks the status of the charging station 20 as valid, such as because the sensor data 134 closely matches the estimated pose $P_e$, the robot 100 may proceed with attempting to dock at the charging station 20. The docking station map 202 generated by the map generator 220 may include the status designation of valid or invalid for the charging stations 20 of the docking station map 202. Thus, the docking system 200 may determine whether the status of each charging station 20 is valid or invalid and indicate the determined status of valid or invalid with the associated charging station 20 in the generated docking station map 202. When the docking station map 202 is then later queried by the robot 100, the robot 100 may know whether the status of a charging station 20 is valid or invalid and determine whether to attempt docking at the charging station 20 based on the status designation.

Figure 2E:
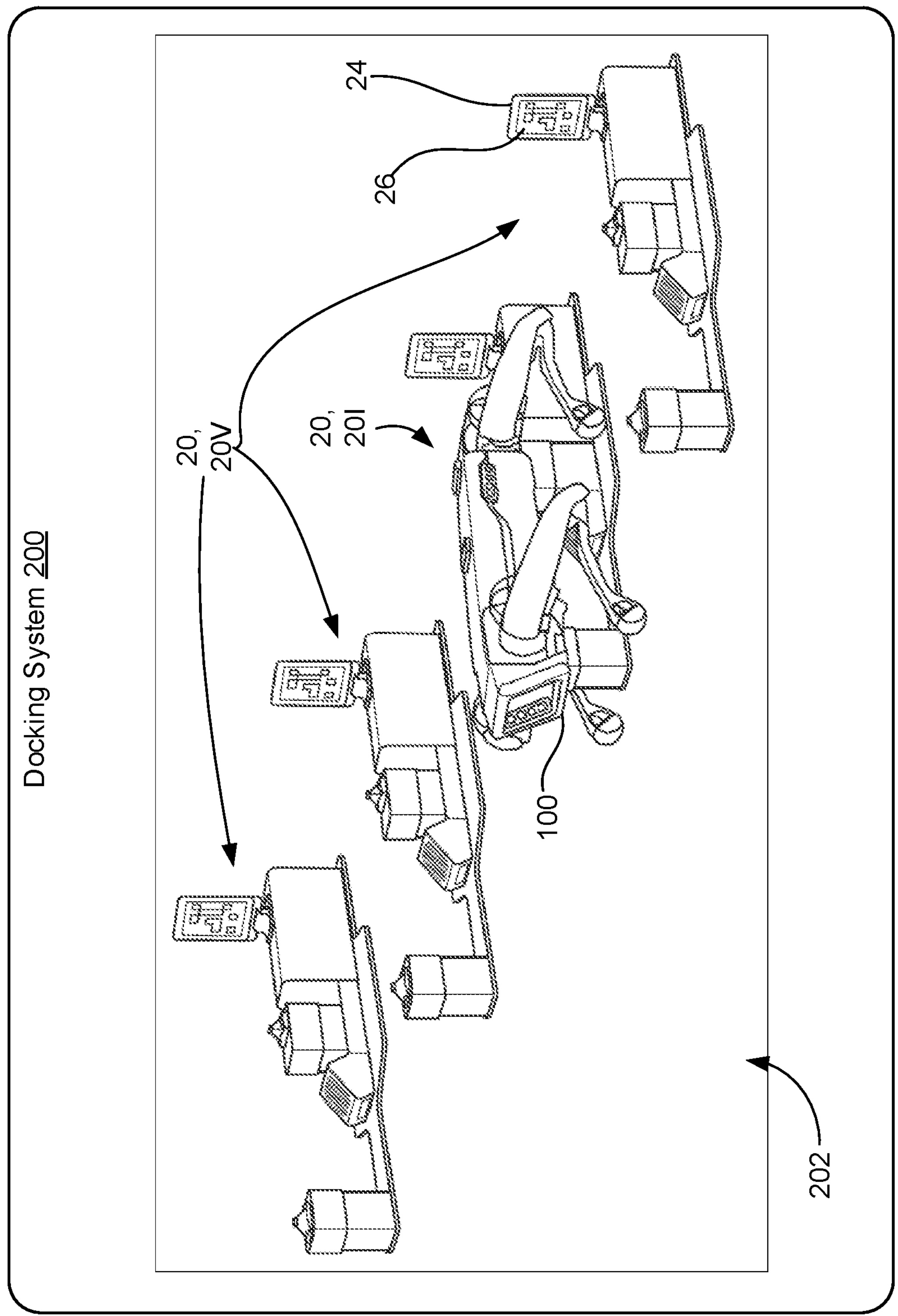
FIG. 2E is a perspective view of an example rendering of a docking station map.
Figure 2F:
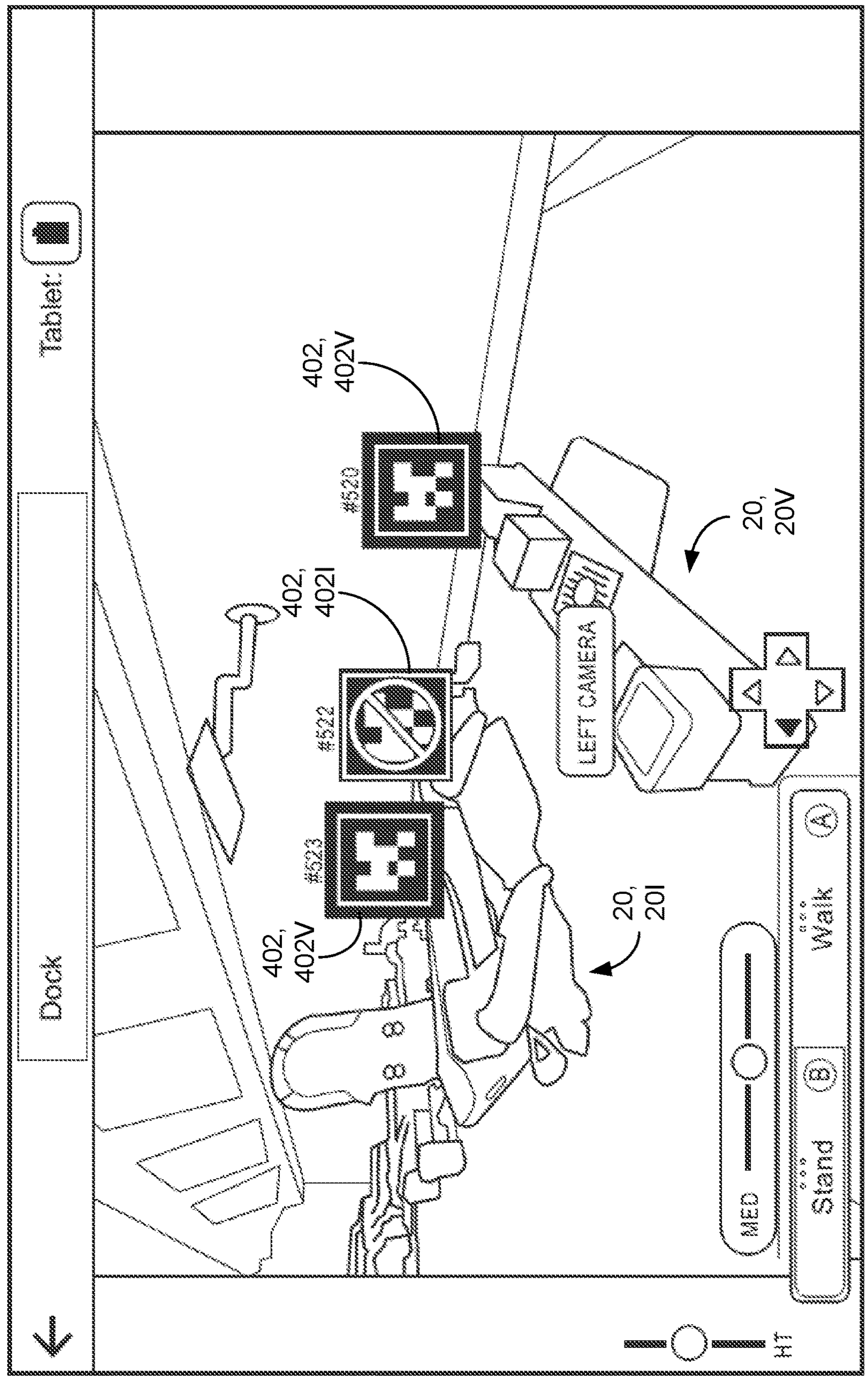
FIGS. 2F and 2G are views of example user interfaces generated based at least in part on the docking station map of FIG. 2E.
Figure 2G:
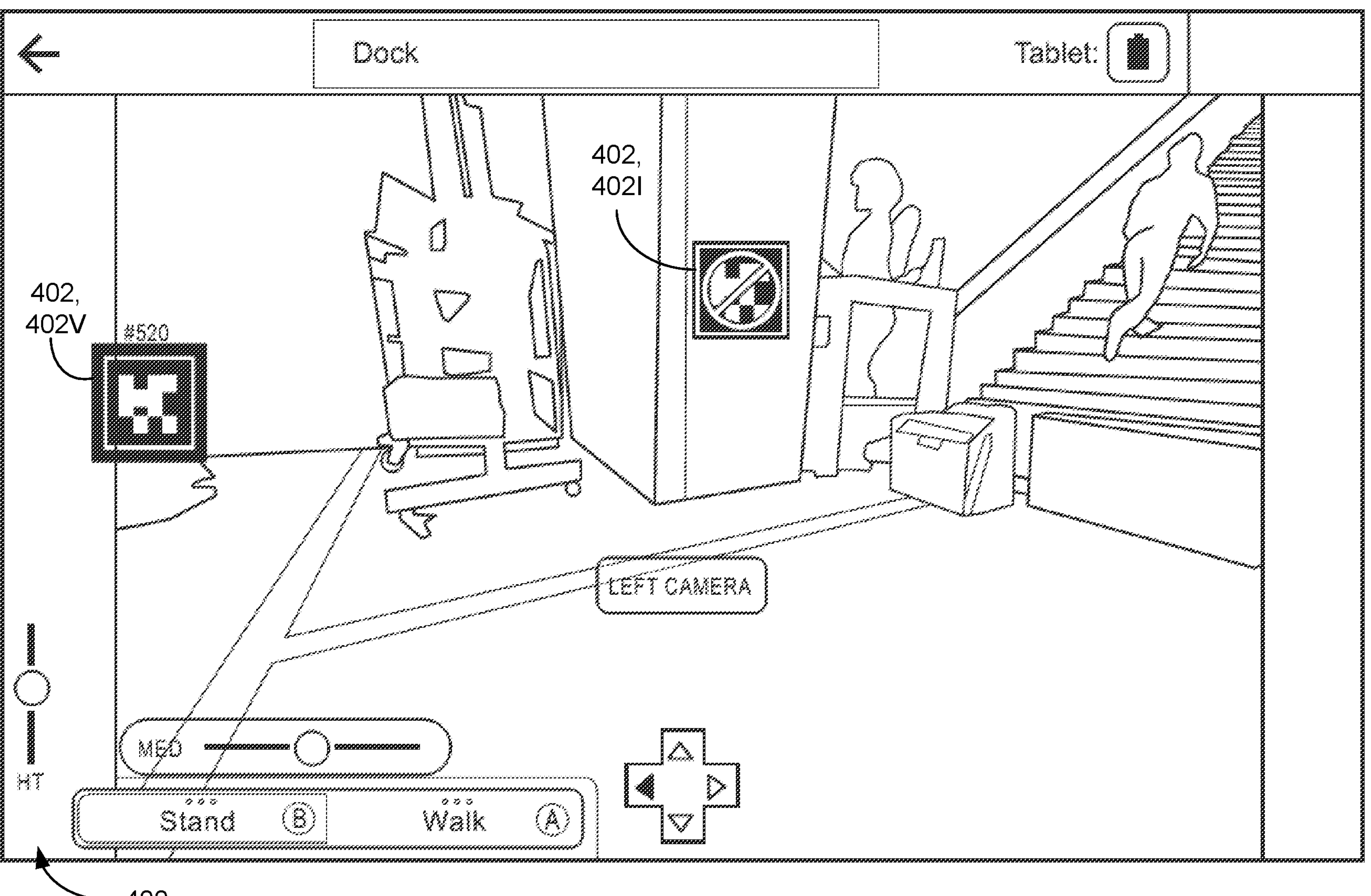

For example, FIGS. 2E-2G illustrate the status indications of valid and invalid for a charging station 20. In FIG. 2E, a rendering of the docking station map 202, similar to the high level rendering of FIG. 2D, indicates knowledge of four charging stations 20 and their respective status indicators. Three charging stations are designated in the docking station map 202 as valid charging stations 20V that the robot 100 may attempt to dock with. A fourth charging station 20 is designated in the docking station map 202 as an occupied or unavailable or invalid charging station 20I because, based on sensor data 134, it has been determined that the charging station 20 is invalid for the robot 100 to attempt to dock with. As shown in the illustrated implementation, the docking system 200 may determine that another robot 100 is docked at a charging station 20, such as based on sensor data 134 or from a signal from the docked robot 100, and mark that charging station 20 as an invalid charging station 20I.

As shown in FIGS. 2F and 2G, the robot may, such as based on the docking station map 202 and the fiducial 26 for a given charging stations 20, identify a charging station 20 in the environment 10 and the valid or invalid status indicator of the charging station 20. FIGS. 2F and 2G represent example graphical user interfaces (GUIs) 400 that display images viewable by a user, the images representative of sensor data 134 captured by one or more sensors 132 at the robot 100, so that, for example, the user may monitor maneuvers of the robot 100 or view the environment 10 about the robot 100. The GUI 400 may display a status indicator 402 for a given charging station 20, such as a valid status indicator 402V or an invalid status indicator 402I. For example, in FIG. 2F, the robot 100 identifies, based on the docking station map 202, the presence of two valid charging stations 20V and one invalid charging station 20I and the GUI 400 accordingly displays appropriate status indicators 402 at the position in the image corresponding to the respective charging stations 20. In FIG. 2G, the robot 100 identifies, based on the docking station map 202, the presence of one invalid charging station 20I and the GUI 400 displays the appropriate invalid status indicator 402I.

In some configurations, the docking system 200 may use the geometry of the known charging station 20 and from this geometry generate a fake three-dimensional point cloud representing that geometry. With this approach, the fake point cloud is in a similar data format as to the sensor data 134. Since both the fake point cloud and the sensor data 134 are in the same data format, the docking system 200 may perform a search of the actual sensor data 134 to locate the actual charging station 20. For example, the docking system 200 uses an iterative closest points (ICP) algorithm to process the comparison between the fake point cloud representing the known geometry of the charging station 20 and the actual point cloud from the actual sensor data 134 sensed by the robot 100. In some implementations, the docking system 200 narrows the search space by using fiducial detection to understand a general vicinity for the charging station 20. In some configurations, the docking system 200 transforms the fake data and actual data to a camera-independent view by converting the actual sensor data 134 and the fake sensor data into a top-down view.

Additionally or alternatively, the robot 100 may use the docking station map 202 to perform a power-off sequence when docked on the charging station 20. That is, the robot 100 may perform a power-off sequence after the robot 100 lowers its body 110 onto the one or more terminal contacts 22T of the one or more alignment towers 22A. For instance, the robot 100 may power-off and be wholly supported by the one or more alignment towers 22A such that the legs 120 of the robot 100 are suspended from the robot 100 and no longer in contact with the ground surface 14. In this instance, the power-off sequence may slowly reduce pressure at the feet 124 of the robot 100 (e.g., until all contact force at the feet 124 has been eliminated). When performing this power-off sequence, the robot 100 may be sensing its surroundings (i.e., generating and interpreting sensor data 134) to determine if there are any issues during the sequence. Namely, if the robot 100 is slightly misaligned with towers 22A or contact terminals 22T, this power-off sequence may decouple the charging connection between the robot 100 and the charging station 20 or worse cause the robot 100 to roll (or pitch or yaw) and fall off of the tower 22A. To prevent some of these issues, the robot 100 may use the docking station map 202 to provide the robot 100 with an understanding of its relationship with the charging station 20 during the power-off sequence. For instance, the robot 100 compares sensor data 134 received during the power-off sequence to terrain information or other details from the docking station map 202.

Figure 3:
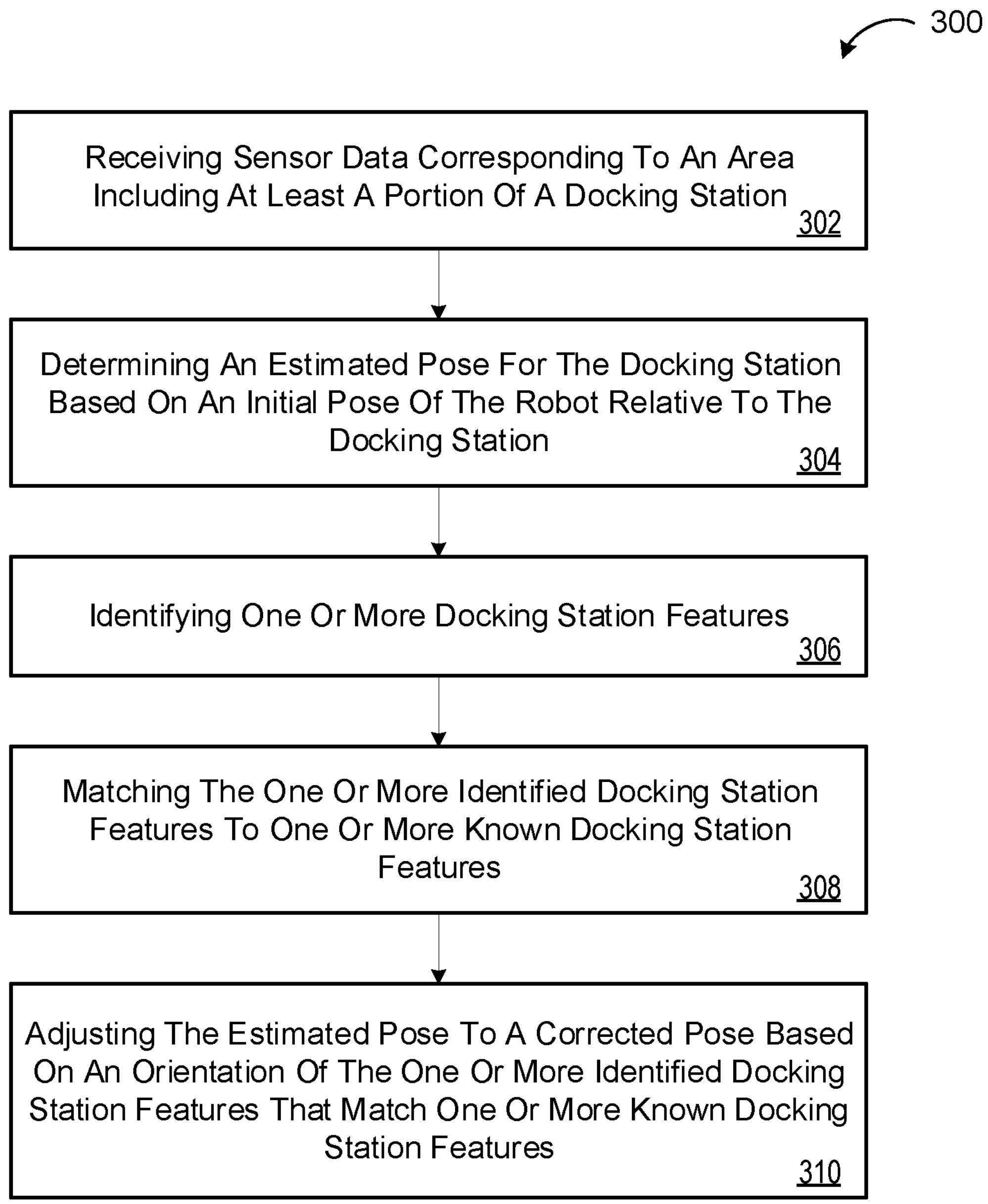
FIG. 3 is a flowchart of an example arrangement of operations for a method of controlling a robot to identify a docking station and adjust a pose of the robot for the docking station.

FIG. 3 is a flowchart of an example arrangement of operations for a method 300 of controlling the legged robot 100 to identify the docking station 20 and adjust the pose P of the legged robot 100 for the docking station 20. The method 300 may be a computer implemented method executed by data processing hardware 142 of the legged robot 100, which causes the data processing hardware 142 to perform operations. At operation 302, the method 300 includes receiving sensor data 134 corresponding to an area comprising at least a portion of a docking station 20. The method 300, at operation 304, includes determining an estimated pose Pc for the docking station 20 based on an initial pose P of the legged robot 100 relative to the docking station 20. At operation 306, the method 300 includes identifying one or more docking station features 22 from the received sensor data 134 corresponding to the area comprising at least the portion of the docking station 20. The method 300 further includes, at operation 308, matching the one or more identified docking station features 22 to one or more known docking station features 22. At operation 310, the method 300 includes adjusting the estimated pose Pc for the docking station 20 to a corrected pose Pc for the docking station 20 based on an orientation of the one or more identified docking station features 22 that match the one or more known docking station features 22.

Figure 4:
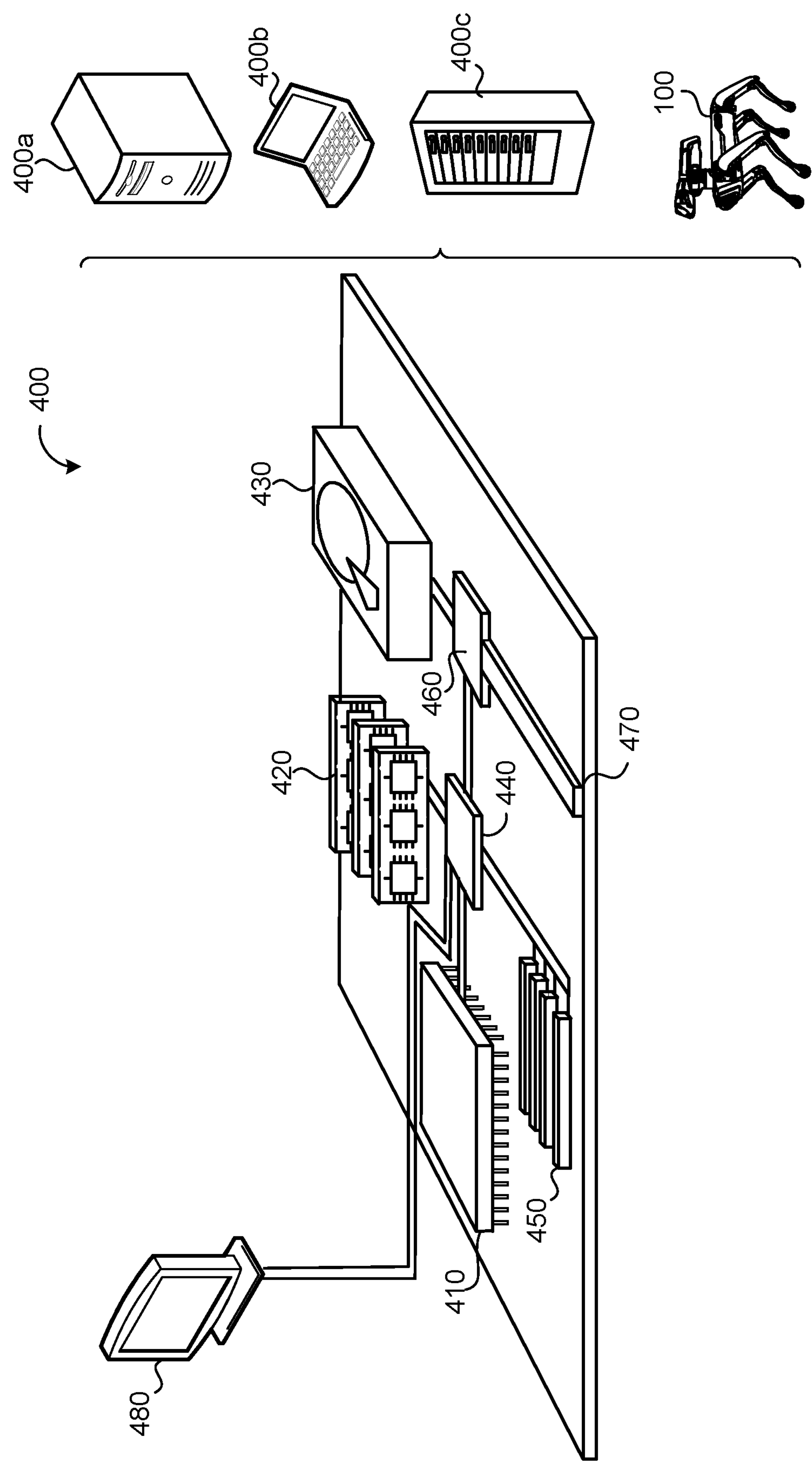
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware 142, 162), memory 420 (e.g., memory hardware 144, 164), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a legged robot causes the data processing hardware to perform operations comprising:

receiving sensor data corresponding to an area comprising at least a portion of a docking station configured to charge a battery associated with the legged robot;

detecting a fiducial associated with the docking station;

determining an initial docking pose of the legged robot relative to the docking station based on the detected fiducial;

determining an estimated pose for the docking station based on the initial docking pose of the legged robot relative to the docking station;

identifying one or more docking station features from the received sensor data corresponding to the area comprising at least the portion of the docking station;

matching the one or more identified docking station features to one or more known docking station features;

adjusting the estimated pose for the docking station to a corrected pose for the docking station based on an orientation of the one or more identified docking station features that match the one or more known docking station features; and determining a region where the legged robot should avoid moving a body of the legged robot based on the one or more known docking station features.

2. The method of claim 1, wherein the operations further comprise instructing the legged robot to dock at the docking station using the corrected pose for the docking station.

3. The method of claim 1, wherein the operations further comprise generating a docking station map comprising terrain information about the docking station using the corrected pose for the docking station.

4. The method of claim 3, wherein the docking station map comprises one or more regions including the region where the legged robot should avoid moving the body of the legged robot and a no-step region where the legged robot should avoid touching down a respective foot of a leg of the legged robot, the no-step region is located in the area comprising at least the portion of the docking station.

5. The method of claim 3, wherein the docking station map comprises one or more regions corresponding to the region where the legged robot should avoid moving the body of the legged robot, the one or more regions located in the area comprising at least the portion of the docking station.

6. The method of claim 3, wherein the docking station map comprises one or more regions indicating a height of the identified docking station features, the one or more regions located in the area comprising at least the portion of the docking station.

7. The method of claim 3, wherein the docking station map comprises a status indicator for the docking station, the status indicator based on the matching of the one or more identified docking stations features to the one or more known docking station features, and the status indicator identifying availability of the docking station.

8. The method of claim 1, wherein the docking station comprises a respective docking station feature associated with a contact terminal for charging the battery of the legged robot.

9. The method of claim 1, wherein the docking station comprises a respective docking station feature corresponding to an alignment tower, the alignment tower configured to support at least a portion of the legged robot when the legged robot is in a charging pose charging the battery of the legged robot at the docking station.

10. The method of claim 1, wherein the legged robot is a quadruped.

11. A battery-powered robot comprising:

a body;

one or more legs coupled to the body;

data processing hardware; and memory hardware in communication with the data processing hardware, the memory hardware storing instructions that when executed on the data processing hardware cause the data processing hardware to perform operations comprising:

receiving sensor data corresponding to an area comprising at least a portion of a docking station configured to charge a battery associated with the battery-powered robot;

detecting a fiducial associated with the docking station;

determining an initial docking pose of the battery-powered robot relative to the docking station based on the detected fiducial;

determining an estimated pose for the docking station based on the initial docking pose of the battery-powered robot relative to the docking station;

identifying one or more docking station features from the received sensor data corresponding to the area comprising at least the portion of the docking station;

matching the one or more identified docking station features to one or more known docking station features;

adjusting the estimated pose for the docking station to a corrected pose for the docking station based on an orientation of the one or more identified docking station features that match the one or more known docking station features; and determining a region where the battery-powered robot should avoid moving the body of the battery-powered robot based on the one or more known docking station features.

12. The battery-powered robot of claim 11, wherein the operations further comprise instructing the battery-powered robot to dock at the docking station using the corrected pose for the docking station.

13. The battery-powered robot of claim 11, wherein the operations further comprise generating a docking station map comprising terrain information about the docking station using the corrected pose for the docking station.

14. The battery-powered robot of claim 13, wherein the docking station map comprises one or more regions including the region where the battery-powered robot should avoid moving the body of the battery-powered robot and a no-step region where the battery-powered robot should avoid touching down a respective foot of the one or more legs of the battery-powered robot, the no-step region is located in the area comprising at least the portion of the docking station.

15. The battery-powered robot of claim 13, wherein the docking station map comprises one or more regions corresponding to the region where the battery-powered robot should avoid moving the body of the battery-powered robot, the one or more regions located in the area comprising at least the portion of the docking station.

16. The battery-powered robot of claim 13, wherein the docking station map comprises one or more regions indicating a height of the identified docking station features, the one or more regions located in the area comprising at least the portion of the docking station.

17. The battery-powered robot of claim 13, wherein the docking station map comprises a status indicator for the docking station, the status indicator based on the matching of the one or more identified docking stations features to the one or more known docking station features, and the status indicator identifying availability of the docking station.

18. The battery-powered robot of claim 11, wherein the battery-powered robot is a quadruped.

19. The method of claim 1, further comprising:

determining that the one or more identified docking station features are misaligned with the one or more known docking station features based on the matching, wherein adjusting the estimated pose for the docking station to the corrected estimated pose for the docking station is further based the determination that the one or more identified docking station features are misaligned with the one or more known docking station features.

20. The battery-powered robot of claim 11, wherein the operations further comprise:

determining that the one or more identified docking station features are misaligned with the one or more known docking station features based on the matching, wherein adjusting the estimated pose for the docking station to the corrected estimated pose for the docking station is further based the determination that the one or more identified docking station features are misaligned with the one or more known docking station features.

* * * * *